No. 773,681. PATENTED NOV. 1, 1904.
E. A. F. SCHMIDT.
MUSIC EDUCATIONAL DEVICE OR SELF REGISTERING COMPOUND MUSICAL KEY.
APPLICATION FILED NOV. 15, 1899.
NO MODEL. 2 SHEETS—SHEET 1.
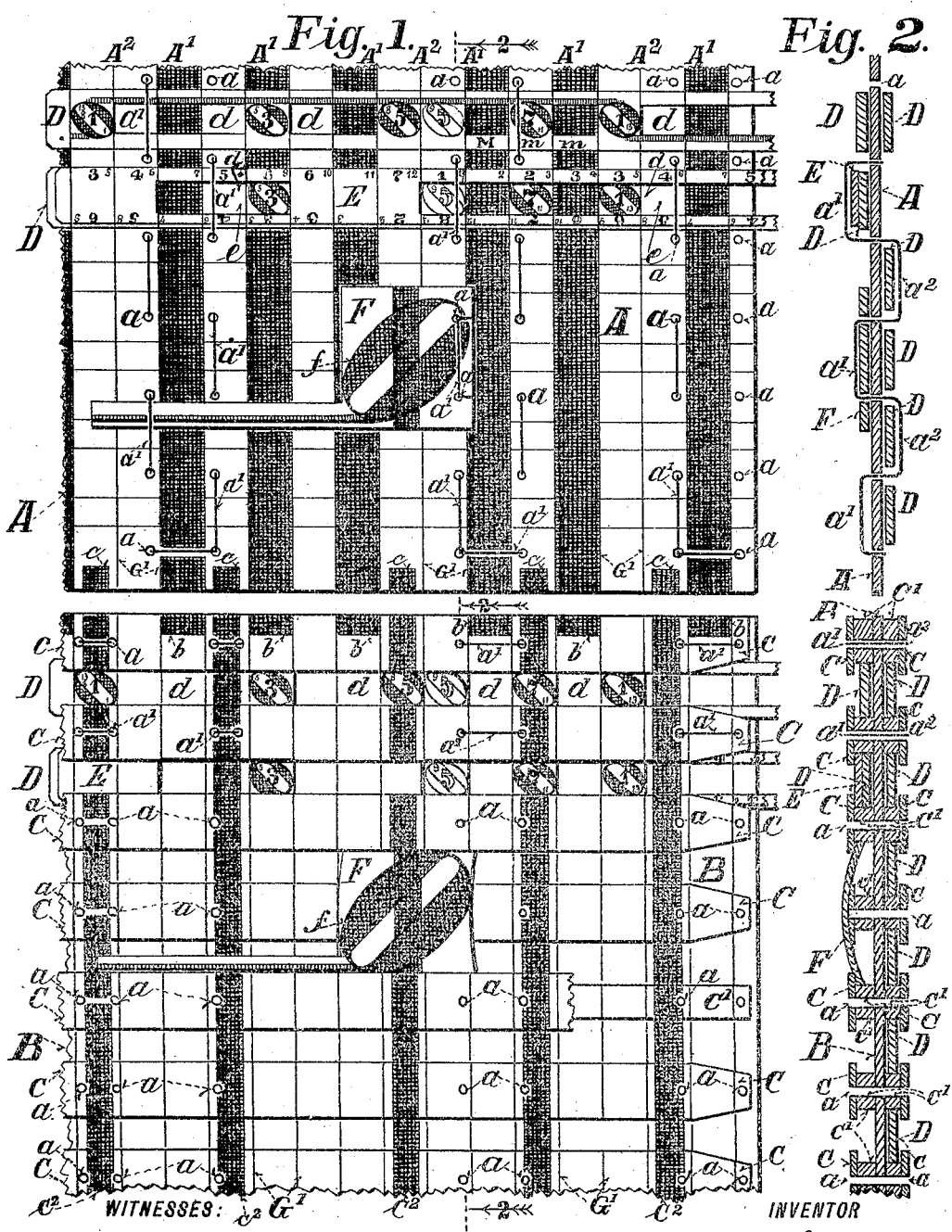
WITNESSES:
R. F. Huber
H. Hibruski
INVENTOR
Ernst A. F. Schmidt.
BY
C. E. McDonald
ATTORNEY.

No. 773,681. PATENTED NOV. 1, 1904.
E. A. F. SCHMIDT.
MUSIC EDUCATIONAL DEVICE OR SELF REGISTERING COMPOUND MUSICAL KEY.
APPLICATION FILED NOV. 15, 1899.
NO MODEL. 2 SHEETS—SHEET 2.
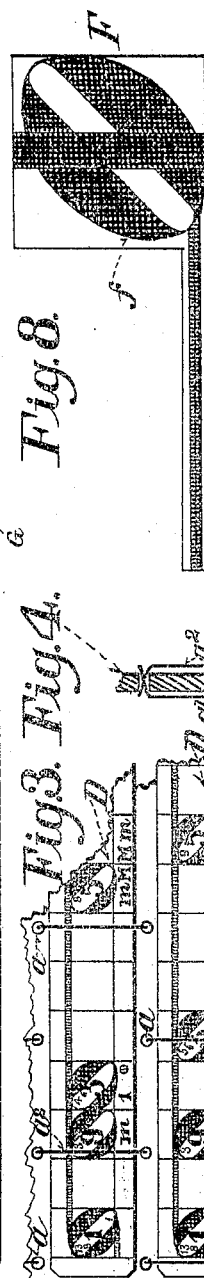
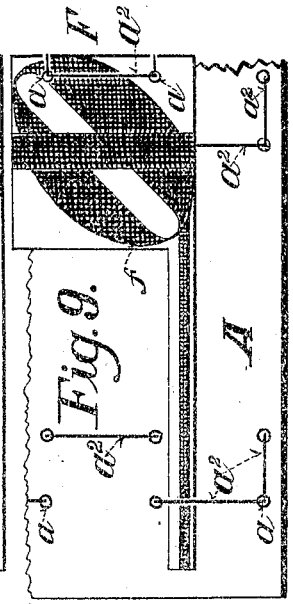
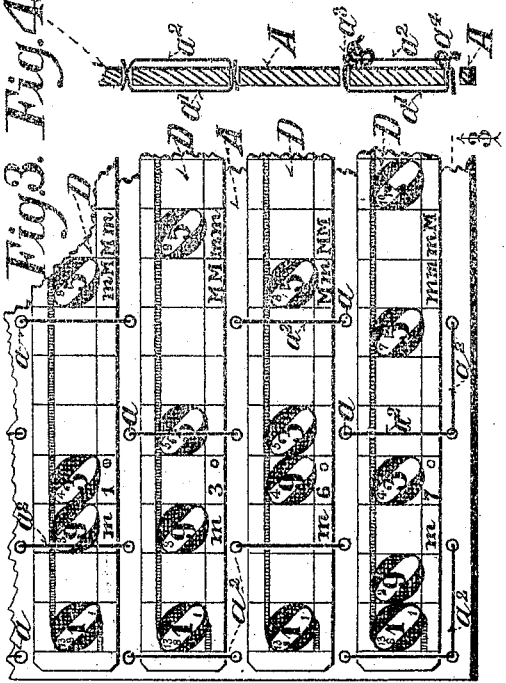
WITNESSES:
R. F. Huber
N. Hitowski
INVENTOR
ERNST A. F. SCHMIDT.
BY
C. E. McDonald.
ATTORNEY.

No. 773,681.                                                                            Patented November 1, 1904.

UNITED STATES PATENT OFFICE.

ERNST AUGUST FRIEDRICH SCHMIDT, OF NEW YORK, N. Y.

MUSIC EDUCATIONAL DEVICE OR SELF-REGISTERING COMPOUND MUSICAL KEY.

SPECIFICATION forming part of Letters Patent No. 773,681, dated November 1, 1904.

Application filed November 15, 1899. Serial No. 737,120. (No model.)

*To all whom it may concern:*

Be it known that I, ERNST AUGUST FRIEDRICH SCHMIDT, a citizen of the United States, residing at New York, in the county and State of New York, have invented a new and useful Music Educational Device entitled "Self-Registering Compound Musical Key" or "Immediate Self-Help Music," of which the following is a specification, referring to the drawings accompanied herewith, which form a part of this specification, and to the letters and figures marked thereon.

This invention relates to educational devices, and especially to that class of such devices as is used in teaching music.

The object of the invention is to produce a device whereby a learner may be enabled easily and readily to recognize any note-symbol or group of note-symbols forming a part of a musical composition.

The object of the invention is also by such device to enable the pupil readily and easily to locate such parts of musical compositions on the keyboard of a musical instrument.

The invention also has for its object by means of such device to enable the pupil not only to locate such parts of musical compositions on the keyboard, but also to recognize and locate the same in the staff of written music when it is indicated on the keyboard-section.

The invention has also divers other objects, which will be more fully hereinafter set forth.

The nature of the invention consists in divers novel features, which will be fully understood from the following general description and the annexed drawings and will be subsequently pointed out in the claims.

In the accompanying drawings, which are hereby made a part of this specification, Figure 1 is a front view of a part of my sectional base-board with note-strips and modifying-strips thereon. Fig. 2 is a sectional view of the same, taken on the line 2 2 of Fig. 1. Fig. 3 is a back view of a part of said base-board, showing how the note-strips are stored thereon. Fig. 4 is a sectional view of the same, taken on the line 3 3 of Fig. 3. Fig. 5 is a face view of a note-strip more fully hereinafter described. Fig. 6 is the same with a modifying-strip superimposed. Fig. 7 is a face view of a modifying-strip more fully hereinafter described. Figs. 8 and 9 are views of details more fully hereinafter described.

My base-board may consist of any convenient and available number of sections. In the example of my invention here given I have illustrated it as consisting of two sections. These may be made of any opaque material of sufficient strength; but I prefer to make it of pasteboard or cardboard.

One section of the base-board is designated by A, which will hereinafter be referred to herein as "keyboard-section" A. This section is ruled with parallel heavy dark lines $A'$ to represent the chromatic keys of a musical instrument and with lighter lines $A^2$ to represent the natural keys by the spaces between the lines. This section is inscribed with guide-marks $c$ $c$. It is also pierced with perforations $a$. These perforations extend across the section in lines parallel to the said ruled lines. Through these perforations are drawn the loops $a'$ $a^2$, the loops $a'$ being on the front and the loops $a^2$ on the back of the section. These loops may be made of any convenient and available material; but I prefer to make them of stout thread. They are so arranged that lengthwise of the loops they stand in lines parallel to the said lines $A'$ and $A^2$. Crosswise the loops stand opposite each other in alternate lines. The ends of the threads which form these loops may be secured in any convenient and available way; but I prefer to draw the threads far enough through the board to form a loop on the back side and fasten them by means of knots, as illustrated by $a^3$ and $a^4$ of Fig. 4.

The section B of the base-board, which will be hereinafter referred to as "staff-board" section B, is ruled with lines $C^2$, which extending across the section parallel to each other are arranged to represent the staff-lines on which music is written. This staff-board section B is also inscribed with guide-marks $b$. The staff-lines $C^2$ and the guide-marks $b$ are so arranged that the staff-lines register with the guide-marks $c$ on the keyboard-section A, and the guide-marks $b$ on the staff-board section B register with the lines A' on the keyboard-section A. On the face of this staff-board section B are secured a plurality of channel-strips. These consist each of two pieces. The strip C is the wider of the two. The narrower strip C' is first placed on the face of the staff-board section B. The wider strip C is then placed thereon, and both are made fast, so that the edges of the wider strip will overlap the narrower strip, as illustrated in Fig. 2. These strips are all arranged parallel to each other and may be fastened both on the back and the front, as illustrated in said Fig. 2. They may be secured in any convenient way and with any available fasteners. In the example of my invention here given I have illustrated these channel-strips as being fastened with stitches of thread $a'$, which, as aforesaid, is only one of many ways by which they may be fastened. These channel-strips may, however, be replaced by loops, such as is hereinbefore described, either on the back of this board-section or on the front thereof, or on back and front both, or instead of channel-strip on the back the fastener may extend beyond the back and be arranged so as to form receptacles for storing the note-strips, as hereinafter more fully described.

D designates a note-strip. This may be of any thin flexible material. It may be of any convenient width and length. On this may be inscribed a plurality of note-symbols, which may be of any desired order and number. In the examples of my invention here given it is illustrated as bearing eleven note-symbols in Fig. 5 and as having only six note-symbols in Fig. 1. In each figure only a part of the note-strip is shown. In each note-symbol is inscribed numerals more fully hereinafter explained. On each are inscribed capital "M's" to denote major thirds and small "m's" to denote minor thirds. The note-strip is also graduated with lines G and is perforated with openings $d$ at divers intervals between the note-symbols. These perforations may be of the same size or of divers sizes, as illustrated.

E designates a modifying-strip. This is also to be made of thin flexible material. I prefer to make it of stout cardboard. It is to be of the same width as the note-strips and may be of any desired length. It is pierced with divers openings $e$ of different sizes. Its edges are graduated with lines G, which are arranged to register with the graduations on said note-strips, and it is inscribed with large and small numerals. The large numerals designate the diatonic scale and the small numerals the chromatic scale. The upright numerals are read from left to right and the inverted numerals from right to left.

The staff-board section B of the base-board is also ruled with parallel cross-lines G', which register with the graduation-lines G on the note-strips and the modifying-strips.

F designates a section of an enlarged note-strip, the use of which will be more fully hereinafter described.

The channel-strips or the loops may be applied with equal facility to either of the base-board sections, or either one of them may be applied to both sections, and in either case the device may be operated with equal facility.

To use my invention, one of the note-strips D is slid into the loops $a'$ of the keyboard-section A until the end note-symbol 1 comes onto the position representing the "E" key of the instrument. Then symbol 3 will fall upon the "G'" sharp-key, dark-note symbol 5 upon the "B" key, light-note symbol 5 upon the "C" key, note-symbol 7 upon the "D" key, and the second note-symbol 1 upon the second "E" key. Then if the guide-marks of the two sections of the base-board register properly with the rulings, as illustrated in Fig. 1, the note-symbols on the note-strip on the keyboard-section A will be exactly opposite the proper places to designate all of the same notes in the staff-lines of staff-board section B. If a note-strip, like D of Fig. 1 on the keyboard-section A, be pushed into the space between two adjacent channel-strips of staff-board section B, so as to bring the note-symbol 1 on the staff-board opposite the note-symbol 1 on the keyboard, all the other symbols on the note-strip on the staff-board section will occupy positions exactly corresponding in the staff to the positions of the note-symbols on the strip on the keyboard-section. Thus if the location of any note or group of notes be found in the keyboard they may be instantly located on the staff-board or being found on the staff-board may as quickly be found on the keyboard. If it be desired to modify the group of notes on the note-strip by decreasing their number, a modifying-strip, as E, may be pushed into the holding device directly over the note-strip, as illustrated by E of Fig. 1 and D E of Fig. 6, so that a part of the symbols of the note-strip D will be visible through the openings in the strip E, and a part of said note-symbols will be concealed by the solid part thereof. This effect may be varied by slipping the strip E endwise on the strip D. The graduations G on the modifying-strip indicate the scale graduations of the musical composition represented by the strip. The number of graduations over which a perforation extends indicates the length of the interval between the notes forming that part of the musical composition. If it be desired to modify the musical composition represented by the note-strip D by increasing the number of the note-symbols, this may be accomplished by sliding another note-strip over it in the holding device. On this last-named strip may be inscribed the note-symbols and other educational characters which are to be displayed by it, and as it is perforated it will also allow a part of the note-symbols on the lower strip to be visible through such perforations. Thus the symbols on the upper strip added to the visible symbols on the under strip will increase the number of symbols in the combination. This effect may be varied at pleasure by slipping upper strip lengthwise along the lower strip. Any desired number of these note-strips may thus be placed on each other and the variations thereby rendered more numerous, and any desired number of strips may be used side by side either on the keyboard-section or on the staff-board section, or on both sections simultaneously, so that a complete melody may thus be represented; but in teaching a class it may be that some of the pupils cannot come near enough to distinguish the notes on the note-strip. In that case the sectional note-strip F, with its enlarged note-symbol $f$, is placed over any symbol on the note-strip to which it is desired to call especial attention. If required, a plurality of these sectional strips may be used in the same way. Thus it will be seen that with this invention when the pupil has located a note on the keyboard that note can be instantly referred to its proper place in the note-staff, or if the note be located in the note-staff it can be as quickly and readily referred to its proper place on the keyboard and that when the pupil has become sufficiently familiar with the relative positions of the note-symbols both on the keyboard and the staff-board one or even both sections of the base-board may be dispensed with, and the pupil will then be enabled readily and easily to locate notes on the keyboard from the position of the note-symbols in the staff of written music.

When the note-strips and modifying-strips are not in use, they may be stored by slipping them into the receptacles on the backs of the base-board sections, from whence they may be drawn out when required for use.

Having now described and ascertained what my invention is, how the same is constructed, and how it is practiced and used, what I claim as my invention, and desire to secure by Letters Patent, is—

1. In an educational device, the combination with a base-board comprising two sections, one of said sections ruled with parallel lines to represent the keyboard of a musical instrument, inscribed with guide-marks, and pierced with divers perforations, the other one of said base-board sections ruled with parallel lines representing the staff-lines of written music, and inscribed with guide-marks, of loops drawn through said perforations in said first-named base-board section, channel-strips on said last-named base-board section, and note-strips of thin material inscribed with note-symbols and divers other characters slidably held in operative position on said base-board sections by said loops and said channel-strips.

2. In an educational device, the combination with a base-board comprising two sections, one a keyboard-section, ruled with parallel lines to represent the keyboard of a musical instrument, inscribed with guide-marks and pierced with divers perforations, the other section of said base-board, a staff-board, ruled with parallel lines to represent the staff upon which music is written, and inscribed with guide-marks registering with the dark parallel lines of said keyboard-section, of loops drawn through said perforations in said keyboard-section, channel-strips comprising narrow strips fastened on the surface of said staff-board section and wider strips fastened on said narrow strips, and all said strips parallel to each other, and a plurality of note-strips composed of thin material inscribed with note-symbols and divers other educational characters, slidably held in operative position on the fronts of said base-board sections by said loops and said channel-strips.

3. In an educational device, the combination with a base-board comprising two sections, one a keyboard-section, ruled with parallel lines to represent the keyboard of a musical instrument, inscribed with guide-marks and pierced with divers perforations extending in lines parallel to said ruled lines, across said keyboard-section, the other section of said base-board, a staff-board ruled with parallel lines to represent the staff on which music is written, and registering with the guide-marks on said keyboard-section, and inscribed with guide-marks registering with the dark parallel lines on said keyboard-section, of loops in the said perforations of said keyboard-section, arranged so that lengthwise said loops stand in lines parallel to said ruled lines, and crosswise stand opposite each other in alternate lines, channel-strips on said staff-board section, and note-strips inscribed with note-symbols and divers other educational characters, slidably held in operative position, on said base-board sections, by said loops and said channel-strips.

4. In an educational device, the combination with a sectional base-board, comprising two sections, one section whereof, the keyboard-section, is ruled with parallel lines representing the keyboard of a musical instrument, inscribed with guide-marks and pierced with divers perforations, the other section of said base-board, the staff-board section, ruled with parallel lines representing the staff - lines whereon music is written, and registering with the guide-marks on said keyboard-section, and inscribed with guide-marks registering with the dark parallel lines on said keyboard-section, of loops drawn through the perforations in said keyboard-section and arranged to form loops on the front and back thereof, channel-strips fastened on said staff-board section, means for fastening said channel-strips thereon extending through the back of said staff-board section, and arranged to operate as storing-receptacles upon said back, and note-strips of thin material inscribed with note-symbols and divers other educational characters, adapted and arranged when in use, to be slidably held on the fronts of said board-sections by said front loops, and said channel-strips, and when not in use to be stored in the back loops of said keyboard-section, and the receptacles on the back of said staff-board section.

5. In an educational device the combination of a sectional base-board comprising separate detached and coacting pieces, loops both on the front and back of one section thereof, another section of said base-board having channel-strips on the front thereof and storing-receptacles on the back thereof, with strips of thin material inscribed with note-symbols and other educational devices slidably held on the front of said base-board sections when in use, and stored in said receptacles on the back thereof when not in use.

6. As education devices, strips of thin material inscribed with note-symbols, and other educational characters, and graduated and pierced with openings denoting musical intervals, in combination with a base-board comprising separate detached sections having loops and channel-strips and slidably held in operative position thereby.

7. As an educational device, the combination with strips of thin material inscribed with note-symbols and other educational characters and modifying-strips of thin material inscribed with educational characters, graduated and pierced with openings registering with said note-symbols when said modifying-strips are placed on said note-strips, of a base-board comprising separate detached and coacting sections loops and channel-strips and by said loops and strips, slidably holding the said note-strips and modifying-strips in operative position.

8. As educational devices sectional note-strips inscribed with one note-symbol each in combination with a base-board comprising two separate detached and coacting sections, loops and channel-strips and by said loops and strips slidably holding said sectional note-strips in operative position.

In testimony whereof I have signed my name to this specification in the presence of two subscribing witnesses.

ERNST AUGUST FRIEDRICH SCHMIDT.

Witnesses:
FREDERICK S. STEINMANN,
ERNST MEYER.